Figure 7:
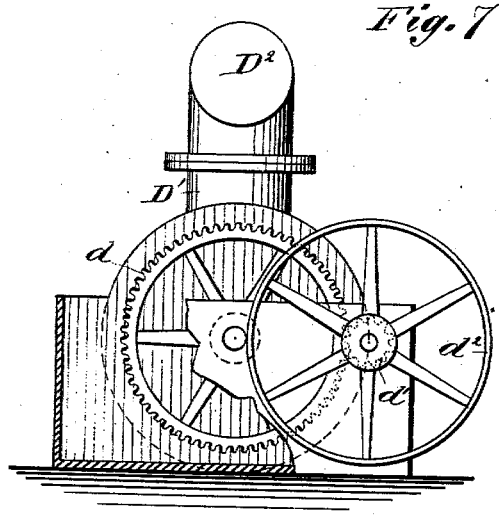

(No Model.) 15 Sheets—Sheet 1.
J. PATTEN.
ICE MACHINE.
No. 301,457. Patented July 1, 1884.
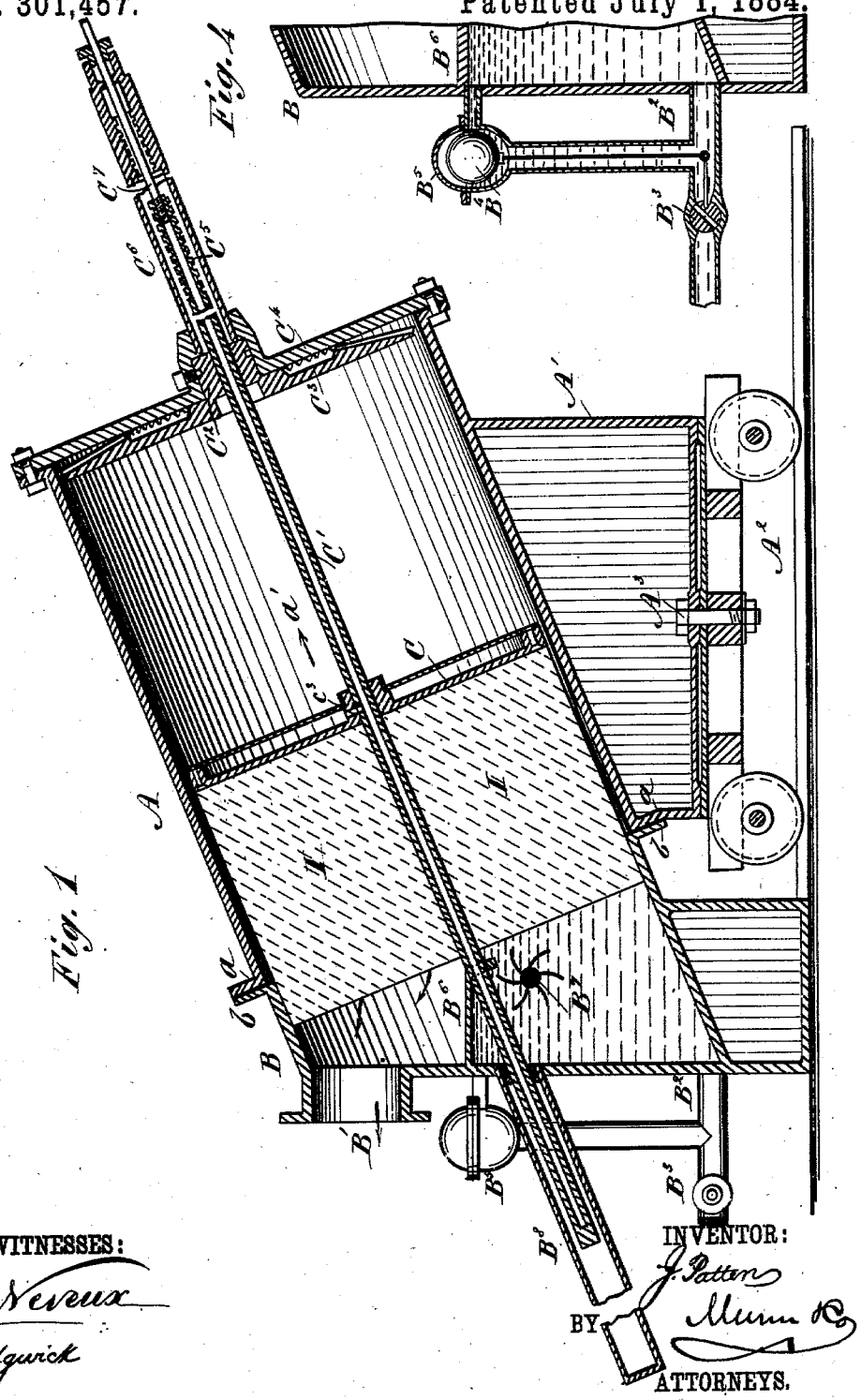
WITNESSES:
C. Neveux
C. Sedgwick
INVENTOR:
J. Patten
BY Munn & Co
ATTORNEYS.

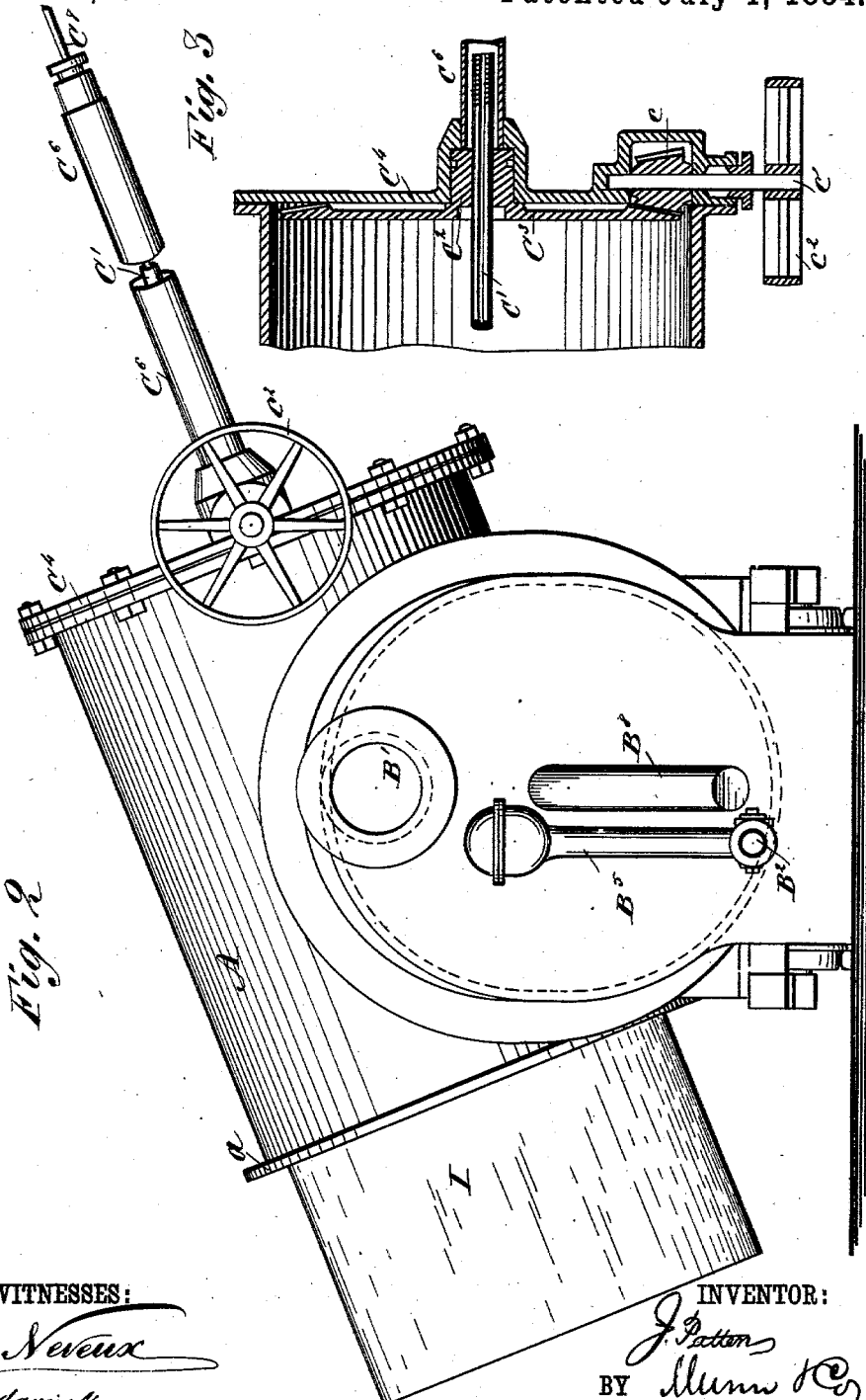

(No Model.)
J. PATTEN.
ICE MACHINE.
No. 301,457.
Patented July 1, 1884.
15 Sheets—Sheet 3.
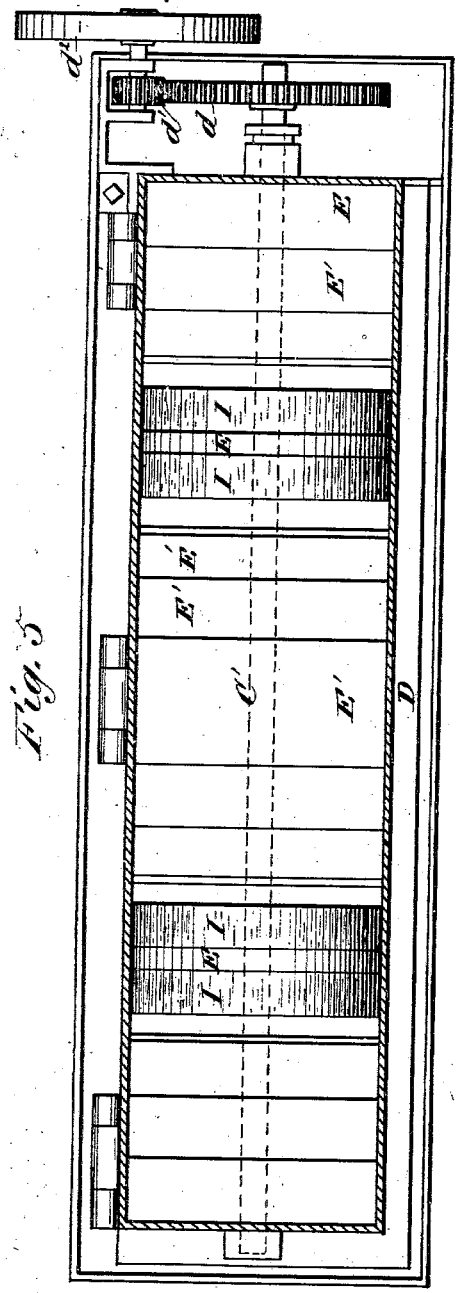
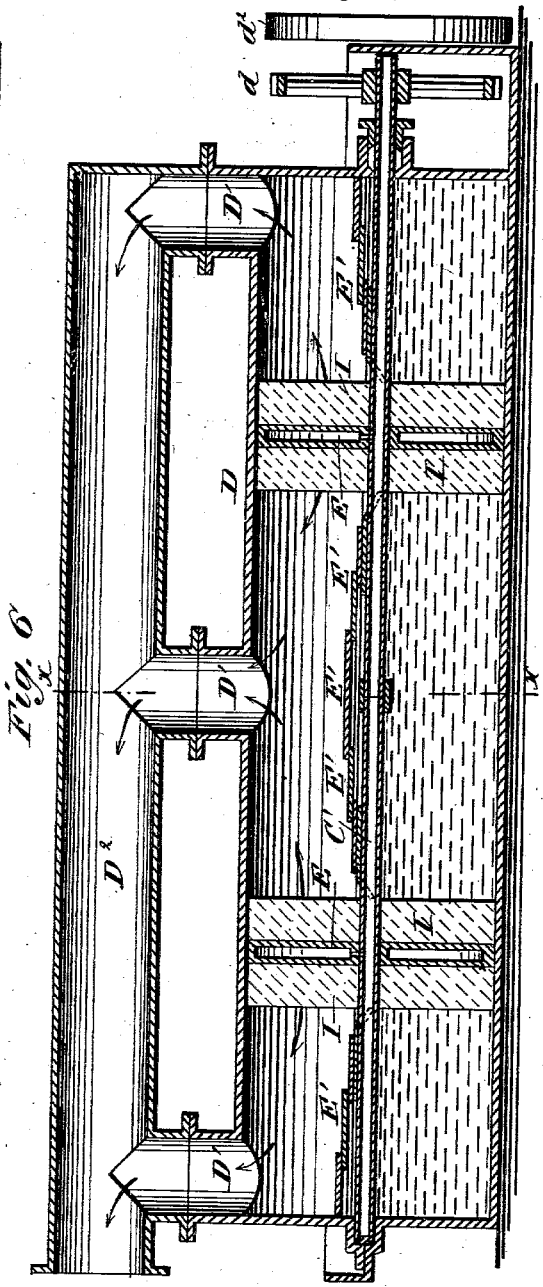
WITNESSES:
C. Neveux
C. Sedgwick
INVENTOR:
J. Patten
BY Munn & Co
ATTORNEYS.

(No Model.)

15 Sheets—Sheet 4.

J. PATTEN.
ICE MACHINE.

No. 301,457.　　　　　　　　　　Patented July 1, 1884.

WITNESSES:
C. Neveux
C. Sedgwick

INVENTOR:
J. Patten
BY Munn & Co
ATTORNEYS.

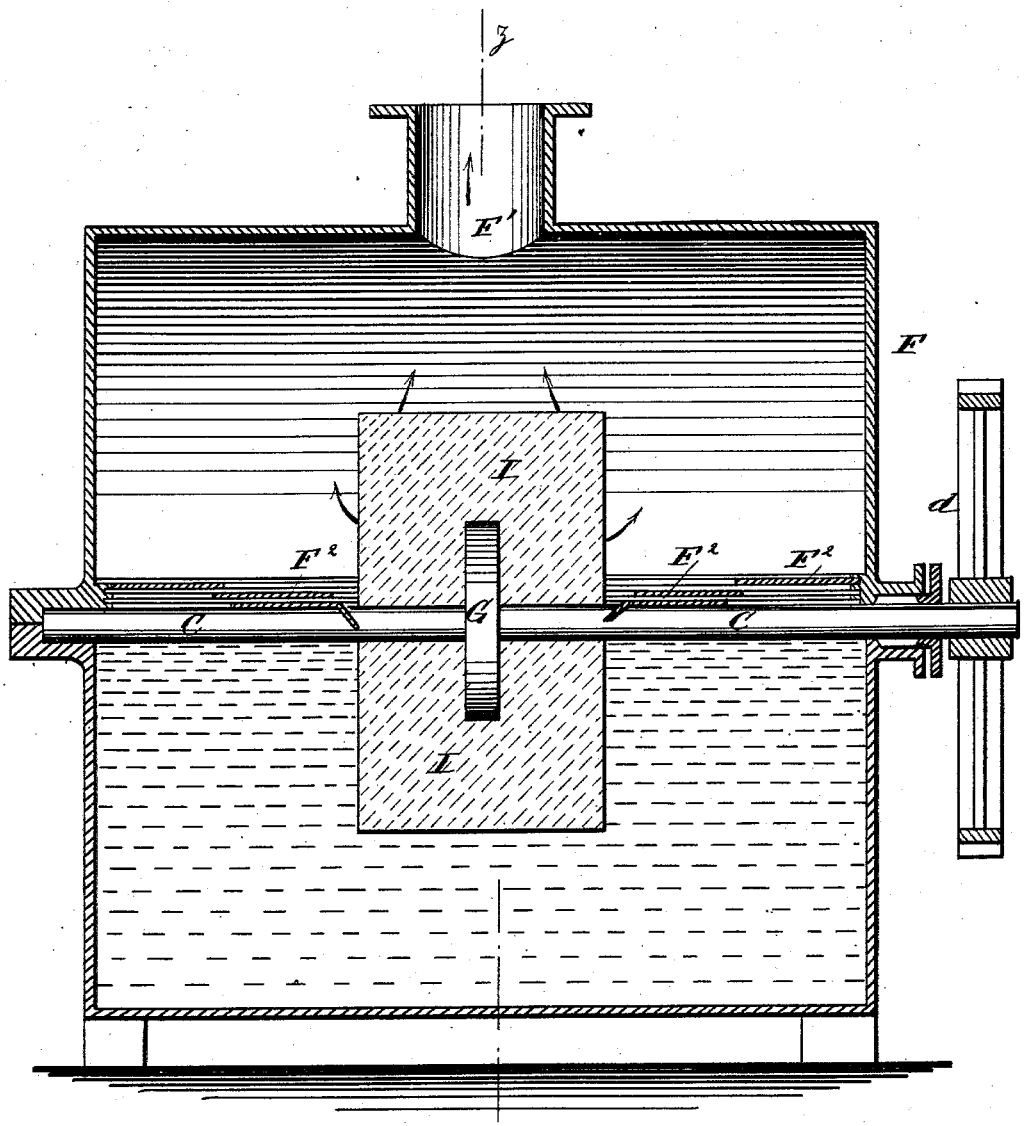

(No Model.)　　　　　　　　　　J. PATTEN.　　　　　　　15 Sheets—Sheet 6.
ICE MACHINE.
No. 301,457.　　　　　　　　　　　　　　Patented July 1, 1884.
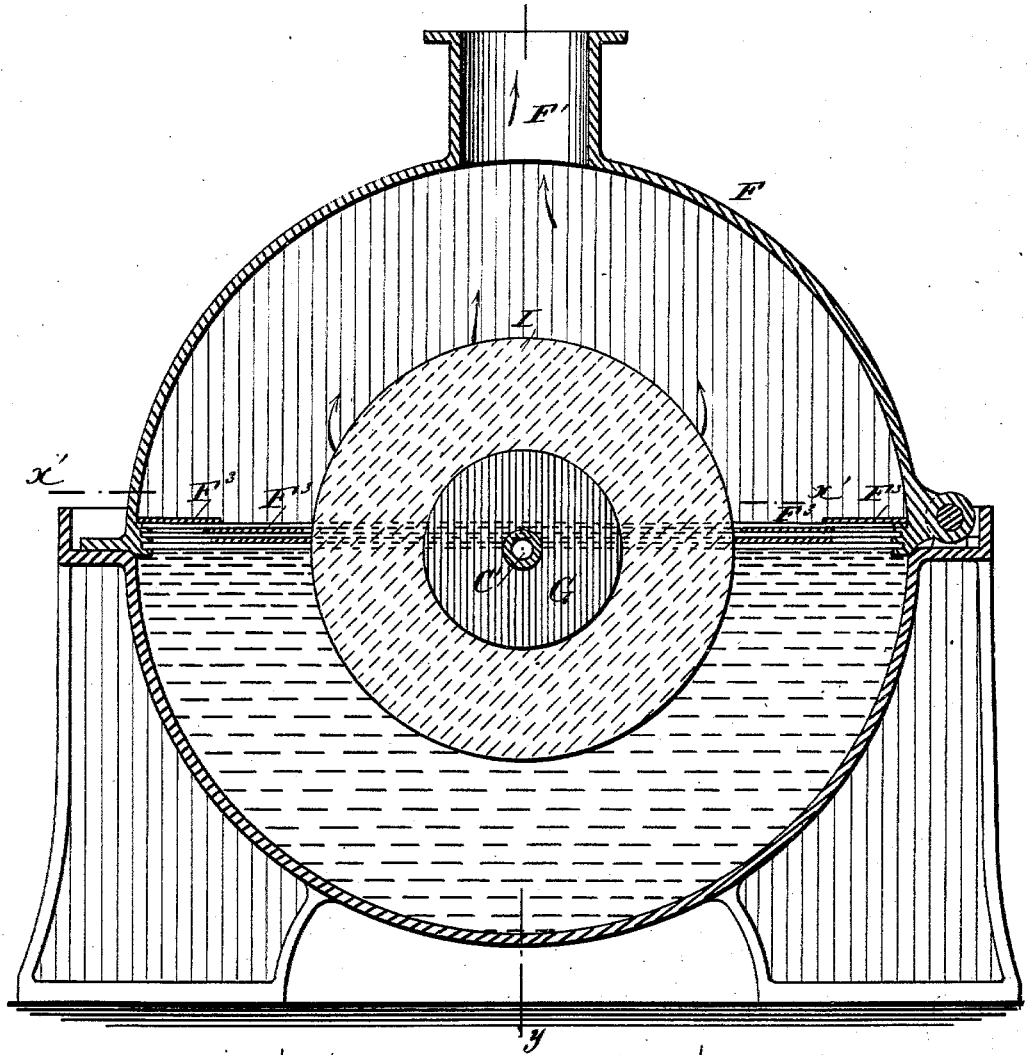
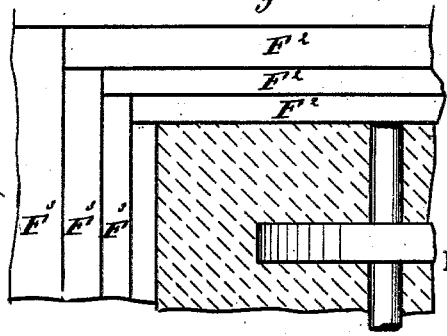
WITNESSES:　　　　　　　　　　　　　　　　　INVENTOR:
C. Neveux　　　　　　　　　　　　　　　　　　J. Patten
Co Sedgwick　　　　　　　　　　　BY　　　Munn & Co
　　　　　　　　　　　　　　　　　　　　　ATTORNEYS.

(No Model.) 15 Sheets—Sheet 7.

J. PATTEN.
ICE MACHINE.

No. 301,457. Patented July 1, 1884.

WITNESSES:
C. Neveux
C. Sedgwick

INVENTOR:
J. Patten
BY Munn & Co
ATTORNEYS.

(No Model.) 15 Sheets—Sheet 8.
J. PATTEN.
ICE MACHINE.
No. 301,457. Patented July 1, 1884.
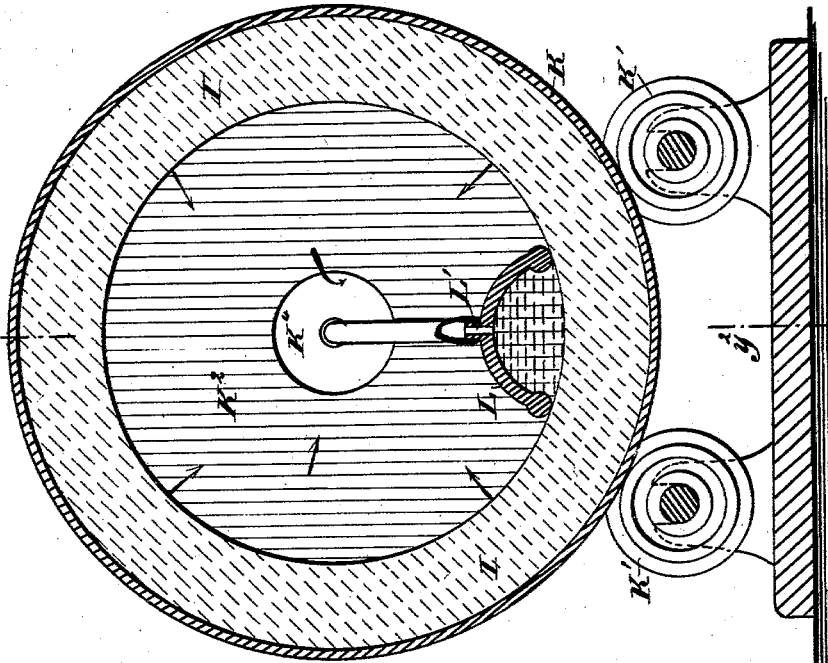
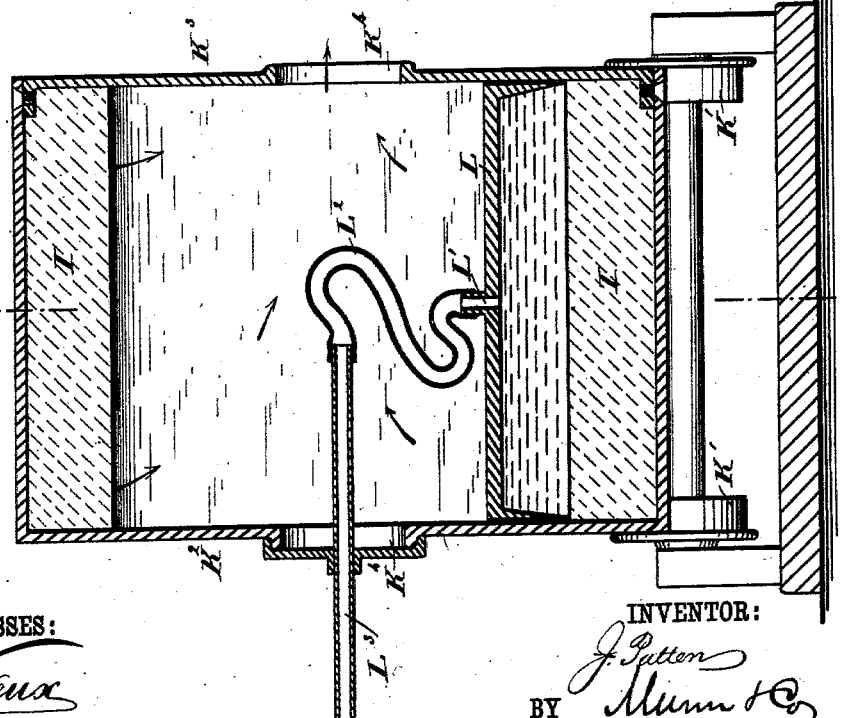
WITNESSES:
C. Neveux
C. Sedgwick
INVENTOR:
J. Patten
BY Munn & Co.
ATTORNEYS.

(No Model.) 15 Sheets—Sheet 9.

J. PATTEN.
ICE MACHINE.

No. 301,457. Patented July 1, 1884.

WITNESSES:
C. Neveux
C. Sedgwick

INVENTOR:
J. Patten
BY Munn & Co
ATTORNEYS.

(No Model.) 15 Sheets—Sheet 10.

J. PATTEN.
ICE MACHINE.

No. 301,457. Patented July 1, 1884.

WITNESSES:
C. Neveux
C. Sedgwick

INVENTOR:
J. Patten
BY Munn & Co
ATTORNEYS.

(No Model.)  J. PATTEN.  15 Sheets—Sheet 11.
ICE MACHINE.

No. 301,457.  Patented July 1, 1884.

WITNESSES:  INVENTOR:
C. Neveux  J. Patten
C. Sedgwick  BY Munn & Co.
ATTORNEYS.

(No Model.) J. PATTEN. 15 Sheets—Sheet 14.
ICE MACHINE.

No. 301,457. Patented July 1, 1884.

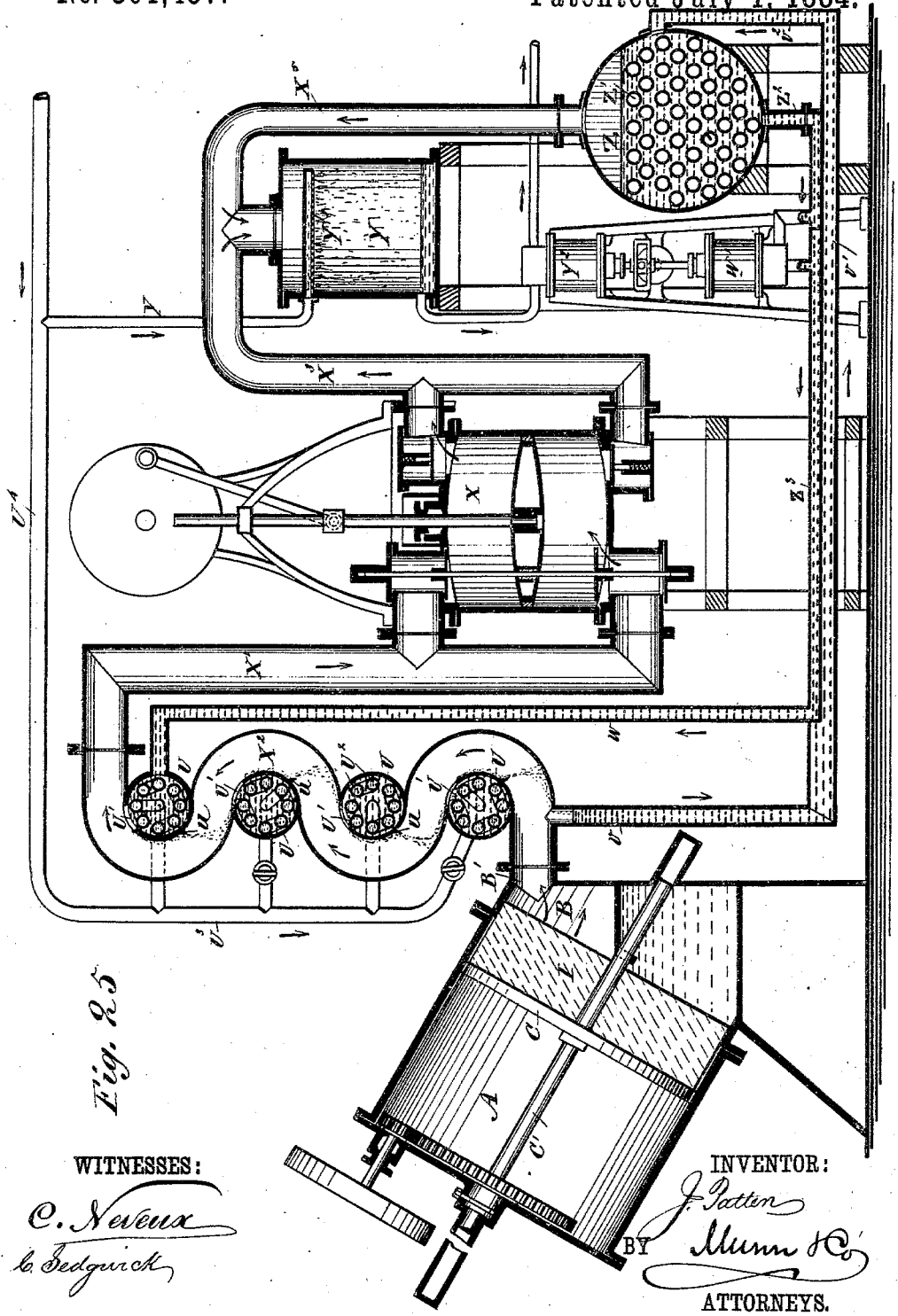

UNITED STATES PATENT OFFICE.

JOHN PATTEN, OF NEW YORK, N. Y.

ICE-MACHINE.

SPECIFICATION forming part of Letters Patent No. 301,457, dated July 1, 1884.

Application filed September 8, 1883. (No model.)

*To all whom it may concern:*

Be it known that I, JOHN PATTEN, of the city, county, and State of New York, have invented a new and Improved Ice-Machine, of which the following is a full, clear, and exact description.

This invention relates to that class of ice-machines in which cold is produced by vaporizing water by means of a vacuum maintained by removing the vapor as rapidly as it is formed.

The object of my invention is to provide a new and improved machine for facilitating the freezing of a block of ice and removing the said block from the machine, and for transporting it before removal and while in the machine.

The invention consists in an ice-machine so constructed that a layer of water is spread or distributed on a surface which is exposed to a partial vacuum, whereby water will be congealed, or a moistened surface can be exposed to cold air. The water is spread on the said surface either by immersing the said surface in water, or water can be spread on the surface by revolving or reciprocating the receptacles in which the water is so protected that it cannot be acted upon by the cold or rarefied air and cannot become congealed.

The invention also consists in an especial construction of parts, in details, and in combinations of the same, as will be fully described and set forth hereinafter.

Reference is to be had to the accompanying drawings, forming part of this specification, in which similar letters of reference indicate corresponding parts in all the figures.

Figure 9:
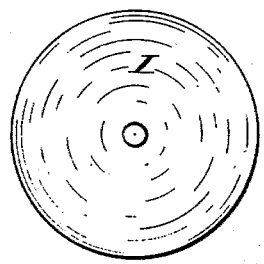
Figure 8:
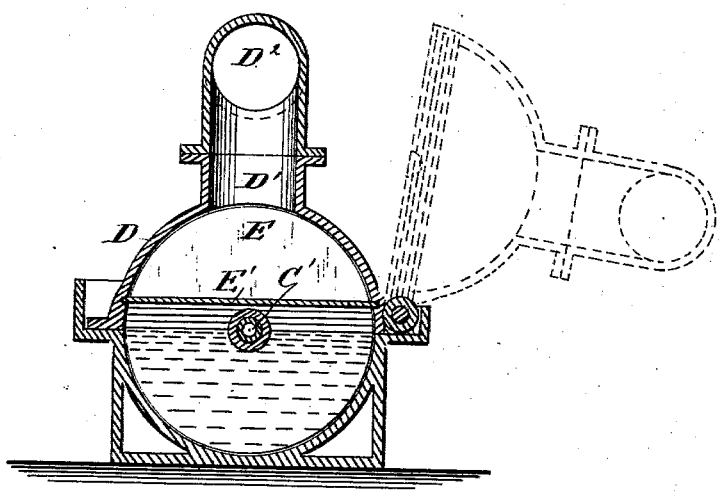
Figure 13:
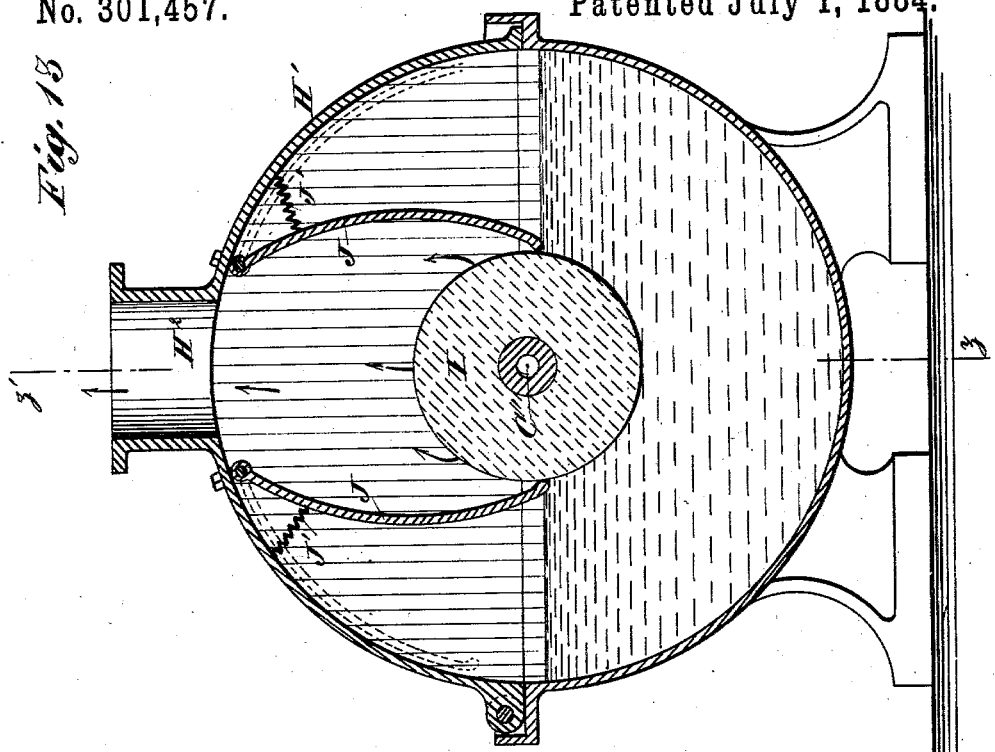
Figure 14:
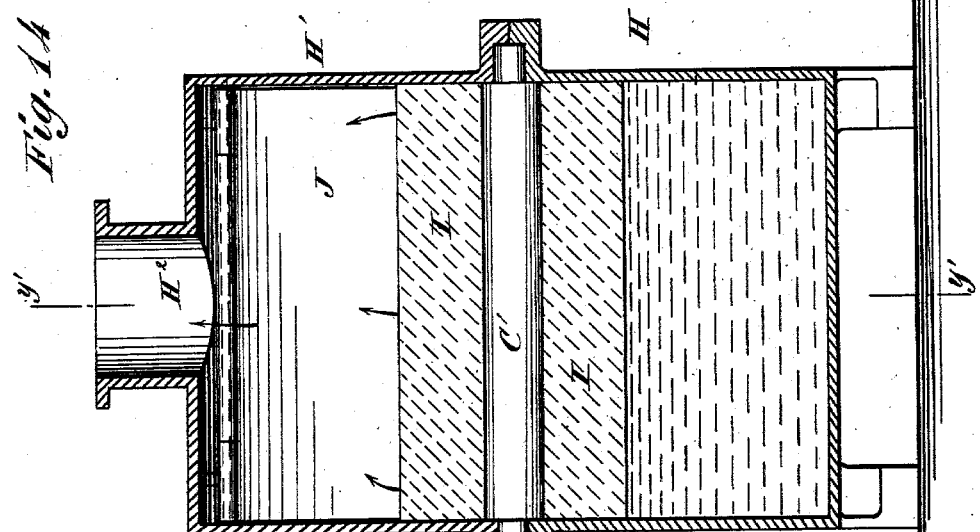
Figure 17:
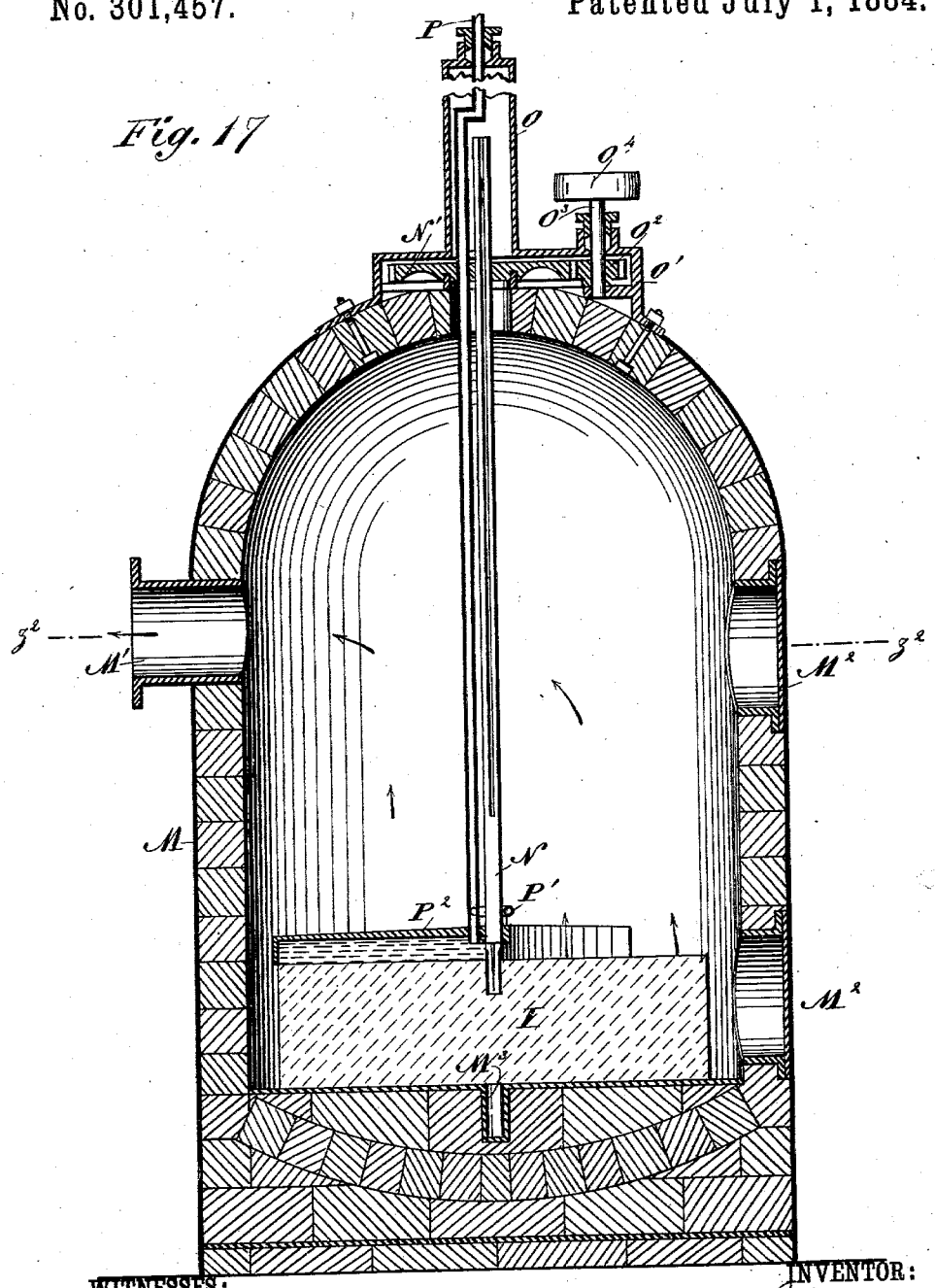
Figure 18:
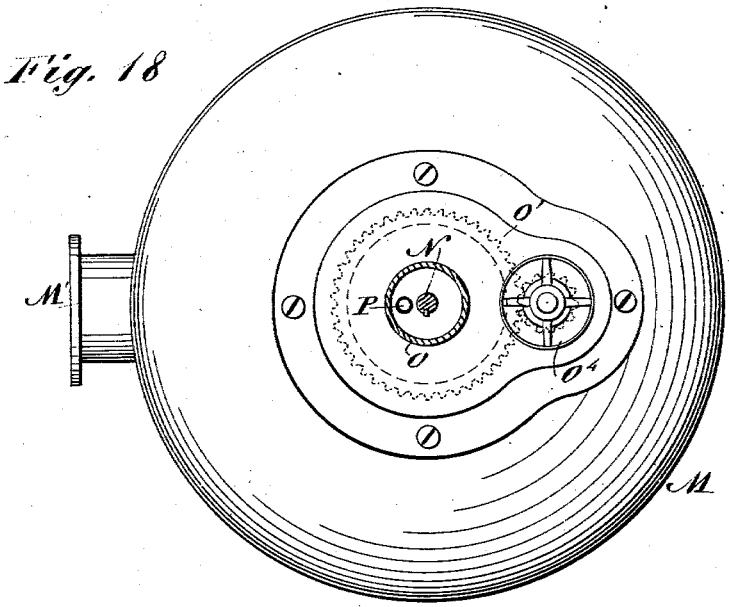
Figure 19:
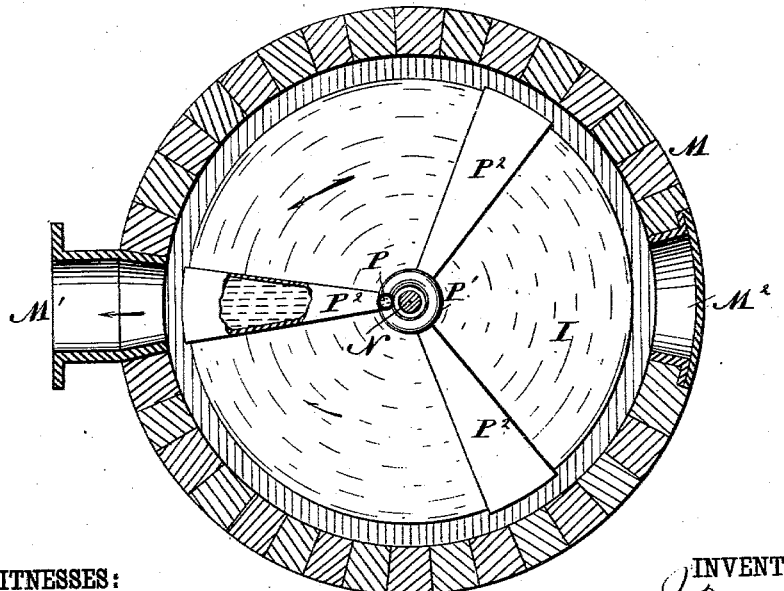
Figure 20:
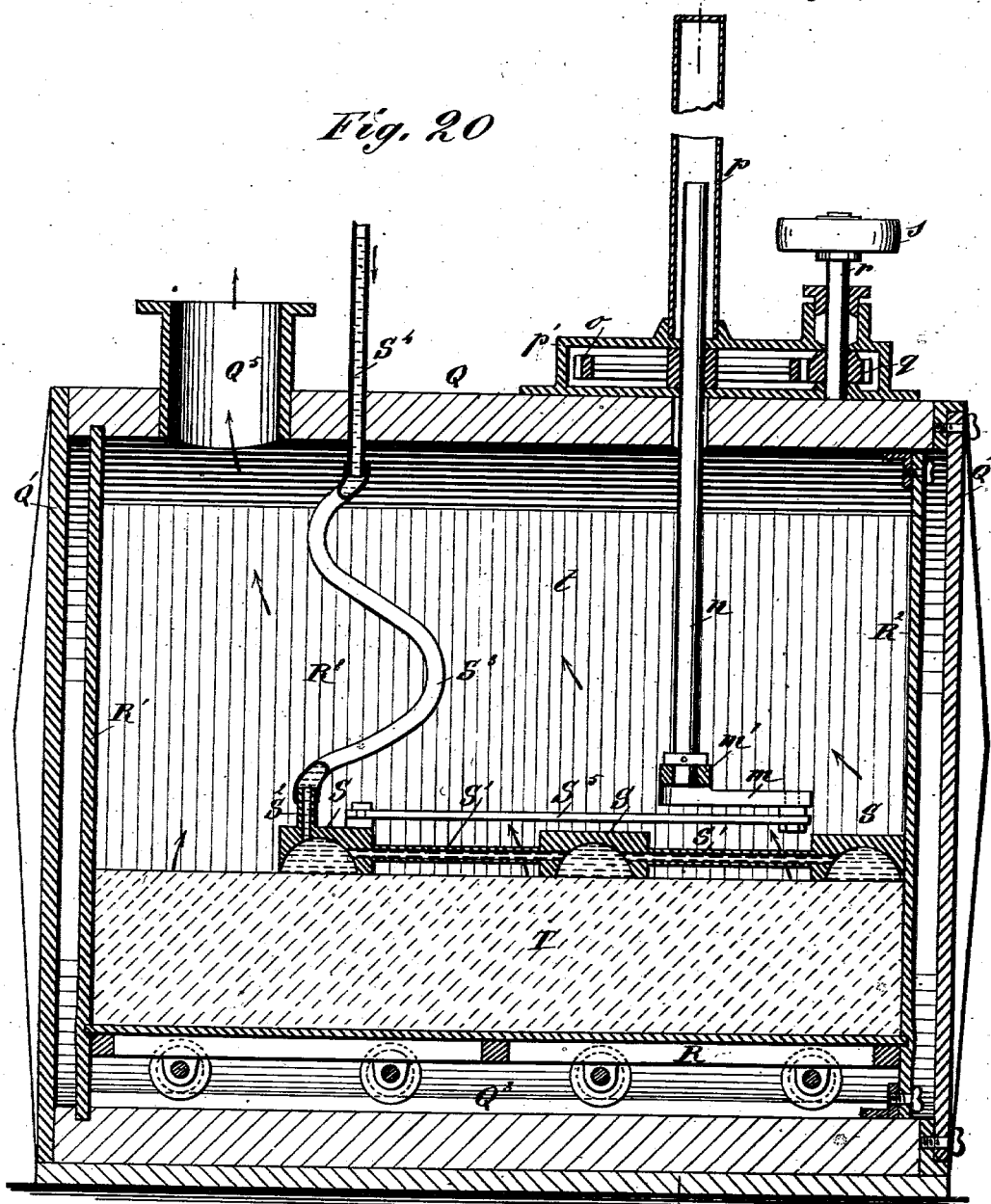
Figure 21:
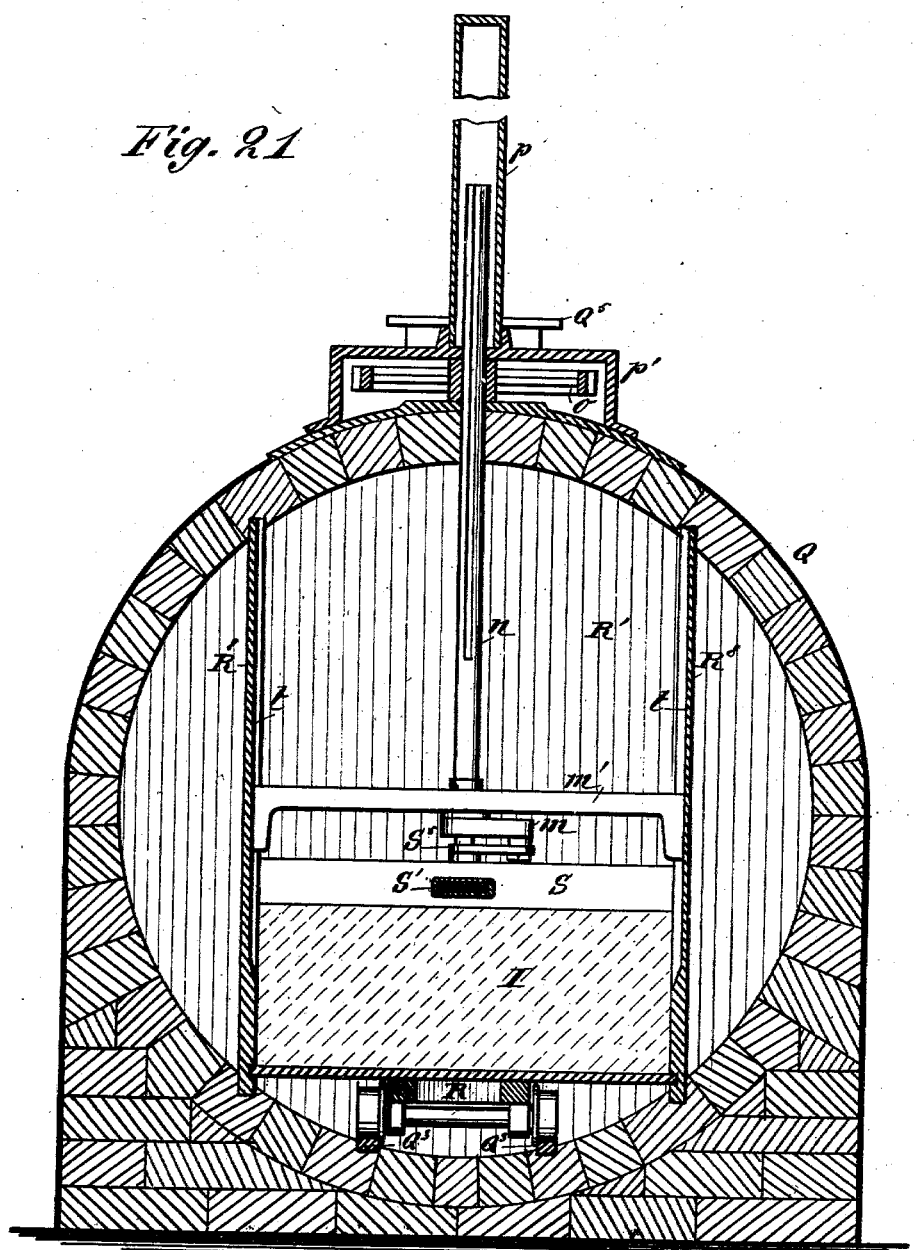
Figure 22:
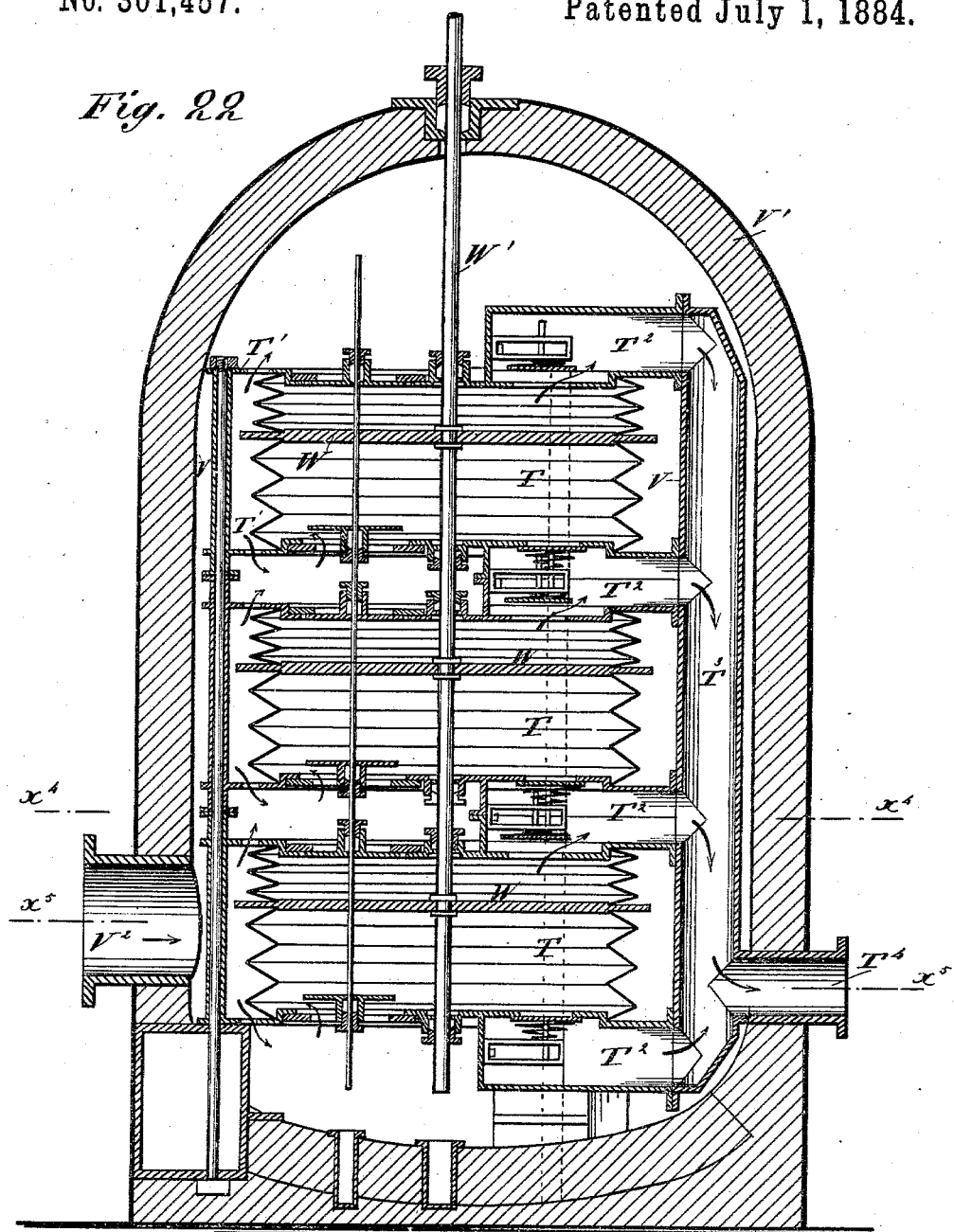
Figure 23:
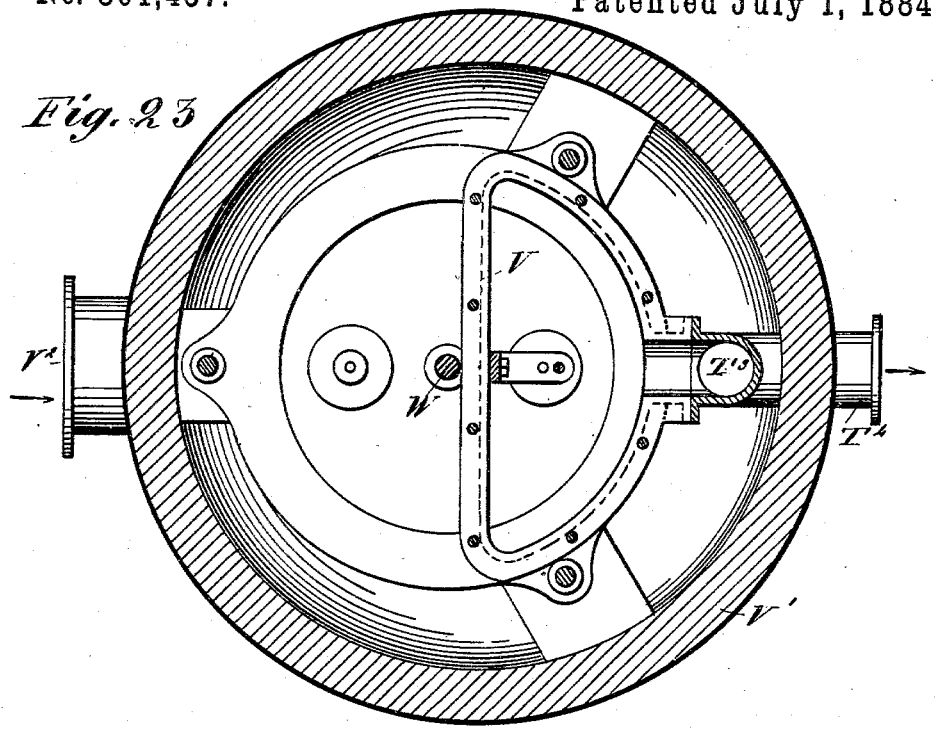
Figure 24:
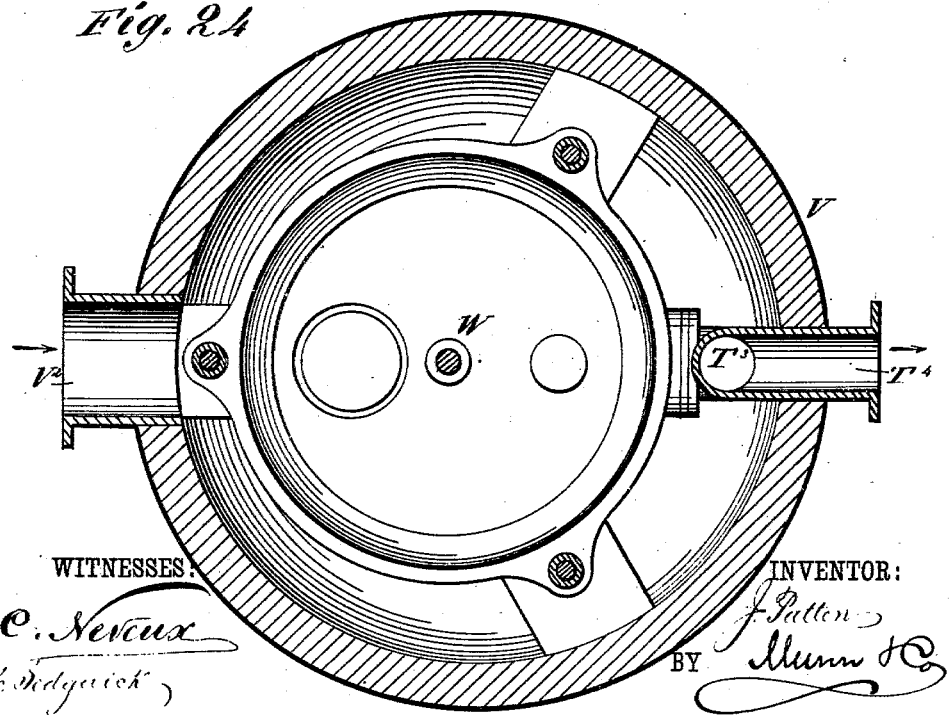

Figure 1 is a longitudinal sectional elevation of my improved ice-machine. Fig. 2 is an end elevation of the same, showing the ice-freezing cylinder turned for removing the block. Fig. 3 is a longitudinal sectional elevation of the cover of the ice-freezing cylinder. Fig. 4 is a sectional view of the float and regulating-valve. Fig. 5 is a sectional plan view of a modification of my improved ice-machine. Fig. 6 is a longitudinal sectional elevation of the same. Fig. 7 is an end elevation of the same, parts being broken out. Fig. 8 is a cross-sectional elevation of the same on the line $x\ x$, Fig. 6. Fig. 9 is a side view of one of the disks or blocks of ice formed in the machine. Fig. 10 is a longitudinal sectional elevation of a further modification of my improved ice-machine on the line $y\ y$, Fig. 11. Fig. 11 is a cross-sectional elevation of the same on the line $z\ z$, Fig. 10. Fig. 12 is a sectional plan view of part of the same on the line $x'\ x'$, Fig. 11. Fig. 13 is a cross-sectional elevation of another modification of my improved ice-machine on the line $y'\ y'$, Fig. 14. Fig. 14 is a longitudinal sectional elevation on the line $z'\ z'$, Fig. 13. Fig. 15 is a cross-sectional elevation of another modification on the line $x^2 x^2$, Fig. 16. Fig. 16 is a longitudinal sectional elevation of the same on the line $y^2 y^2$, Fig. 15. Fig. 17 is a longitudinal sectional elevation of another modification of my improved ice-machine. Fig. 18 is a plan view of the same. Fig. 19 is a plan view of the same on the line $z^2\ z^2$, Fig. 17. Fig. 20 is a longitudinal sectional elevation of another modification of my improved ice-machine. Fig. 21 is a cross-sectional elevation of the same on the line $x^3\ x^3$, Fig. 20. Fig. 22 is a cross-sectional elevation of the blower or bellows used in connection with the ice-machine. Fig. 23 is a sectional plan view of the same on the line $x^4\ x^4$, Fig. 22. Fig. 24 is a sectional plan view on the line $x^5\ x^5$, Fig. 22. Fig. 25 is a longitudinal sectional view of my improved ice-machine, showing it combined with means for absorbing the vapor.

My improved ice-machine can be constructed in various ways; but the principle always remains the same. I will now describe several different constructions.

Referring to Figs. 1 to 4, inclusive, a cylindrical vessel, A, is held inclined downward on a car, A', provided with wheels running on tracks A², the car-body A' being pivoted by a central pin, A³, on the truck, so that the cylinder A can easily be turned on the said vertical pin A³. The cylinder A is provided at its lower open end with a flange, $a$, which is adapted to fit closely against a flange, $b$, formed on the upper end of a short cylindrical vessel, B, the interior diameter of which is slightly less than the interior diameter of the cylindrical vessel A. The vessel B is provided with a flanged neck, B', to which a pipe leading to a vapor-exhaust apparatus can be coupled. A water-inlet pipe, B², leads to the bottom of the vessel B, and is provided with a valve, B³, attached to a lever connected with a float, B⁴, contained in a suitable receptacle, B⁵, in which the water can rise as high as in the vessel B. A transverse partition, B⁶, is provided in the cylindrical vessel B, the said partition B⁶ being so arranged that the middle of its free edge is on the central longitudinal axis of the vessel B. That part of the vessel B below the partition B⁶ contains the water, and the partition B⁶ is to cover the upper surface of the water and prevent the water from being evaporated. An agitator, B⁷, consisting of a hub or cylinder having wings, is journaled in the vessel B below the partition B⁶. A hollow piston, C, fitting closely in the cylindrical vessel B, and thus having a smaller diameter than the cylinder A, is rigidly mounted on a tubular shaft, C', which is journaled in a hub, C², of a bevel cog-wheel, C³, which hub is held to revolve in the neck of the head C⁴ of the cylinder A. The tubular shaft C' is journaled in the free edge of the partition B⁶ in such a manner that the intersection of the central line of the tubular shaft and the middle of the free edge of the partition B⁶ will be exactly on the central longitudinal axis of the cylinder A. The lower end of the tubular shaft is closed and projects into a tubular pocket, B⁸, projecting from the end wall of the compartment or vessel B. The upper end, C⁵, of the tubular shaft C' is screw-threaded, and is adapted to be screwed in the internally-threaded part of a tube, C⁶, held on the central neck or hub of the head C⁴, and projecting from the same. A rod, C⁷, is screwed in the end C⁵ of the tubular shaft C', and projects from the outer end of the tube C⁶, in which it is suitably journaled. A bevel-pinion, c, engages with the bevel cog-wheel C³, resting against the inner surface of the head C⁴, which bevel-pinion is contained in a suitable compartment formed in the head. The bevel-pinion c is rigidly mounted on a shaft, c', suitably journaled, and on the outer end of the said shaft is mounted a belt-pulley, c², over which a belt can be passed for revolving the disk C³. When the machine is started, the piston C is contained in the compartment B and rests against the free edge of the partition B⁶, and the flange a of the cylinder A must rest closely against the flange b of the compartment B. Water is admitted into the compartment B and rises up to the under surface of the partition B⁶. If the level of the water falls, the float B⁴ will fall with it, and will open the valve B³, admitting a greater supply of water, and the float thus regulates the quantity of water in the compartment B. The bevel cog-wheel C³ is rotated from the bevel-pinion c, and rotates the tubular shaft C', which is keyed therein, in such a manner that the tubular shaft can slide in the bevel cog-wheel, and at the same time the bevel cog-wheel can revolve the shaft. If the shaft C' is revolved, the piston C will also be revolved, and half of the surface of the piston will be in contact with the water, the other half being in the vacuum-chamber in the upper part of the compartment B. A partial vacuum is formed in the upper part of the compartment or vessel B by a very powerful exhaust apparatus, vapor-pump, or other suitable device, and this vacuum causes an evaporation of a portion of the ice or of the water on the exposed surface of the disk or piston C. By this evaporation heat is taken from the ice or water, and the water congeals on the exposed surface of the piston C and a layer of ice is formed, as the piston C revolves continuously. While the ice is passing through the vacuum-chamber, a portion of the ice vaporizes, thereby reducing the temperature of its surface several degrees below the freezing-point, so that when the ice is submerged in the water in the lower compartment the water with which it comes in contact will freeze to it, thereby increasing its thickness from one sixty-fourth to one-eighth of an inch. The water carried up by the ice-surface as it passes into the vacuum-chamber is frozen, the surface of the ice is cooled below the freezing-point again, and so on. Every revolution adds a fresh layer of ice to the block of ice, which, in reality, consists of a spiral of ice. As the cylinder of ice grows it forces the piston in the direction of the arrow a'—that is, toward the head of the cylinder A—until finally the threaded end of the tubular shaft C' engages in the threaded part of the tube C⁶, and thereby the tubular shaft C' and the piston C will be drawn up in the direction of the arrow a'. Thereby the tubular shaft C' will be entirely withdrawn from the compartment B, and, with the block of ice I, will be contained entirely within the cylinder A. The cylinder is then withdrawn from the compartment B, and is swung to one side; then the rod C⁷ is unscrewed from the end of the tubular shaft C', and steam is admitted into the tubular shaft C', which steam passes through a suitable aperture, c³, into the hollow piston C. The steam rapidly heats the tubular shaft C' and the piston C, and thereby the cylinder of ice will be released from the tubular shaft and the piston, and will slide out of the cylinder A, as shown in Fig. 2. Now the machine is ready for making another block of ice. The agitator B⁷ is to agitate the water, so that all parts of the end of the block or piston will be moistened.

Referring to Figs. 5 to 9, inclusive, the tubular shaft C' is journaled centrally in a cylindrical vessel, D, connected by a series of tubes or necks, D', with a pipe, D², connected with a vapor-exhaust apparatus. On one end of the tubular shaft C' is mounted a cog-wheel, d, engaging with a pinion, $d'$, mounted on the same shaft with a belt-pulley, $d^2$, whereby the tubular shaft can be rotated. The cylindrical vessel D is composed of two semi-cylindrical sections, which are hinged to each other, the upper end being adapted to be swung over to permit the removal of the block of ice I. On the tubular shaft $C'$ two hollow pistons, E, are mounted, which fit closely against the inner surface of the cylindrical vessel D. A series of sliding partitions, $E'$ $E'$, are held transversely at the middle of the cylinder, the partitions being so arranged that one can slide under the other, the end partitions having their outer edges beveled downward, so that the outer edges of the said partitions will coincide with the horizontal axis of the pistons E. The partitions can be provided with springs for pressing them toward the pistons; or they can be adjusted to rest against the pistons before starting the machine, and can have very close joints, so that they will not slide too easily. The lower part of the cylindrical vessel D is filled with water. The tubular shaft $C'$ is revolved and the air is exhausted from the upper part of the cylindrical vessel, so that half of the pistons E will be exposed to the partial vacuum, and the other half will be in the water contained in the lower part of the cylindrical vessel D. As the shaft $C'$ revolves and the pistons E revolve with it, the moistened surfaces of the pistons E will be exposed to the partial vacuum, and the water on the pistons E will be congealed, and thereby successive layers of ice will be formed on both sides of the pistons—that is, the thickness of the pistons will gradually be increased on both sides, the diameter remaining the same. As the thickness of the pistons increases, the transverse partitions $E'$ are gradually pushed under each other, one partition sliding under the other, until the blocks of ice I extend from the edge of one neck $D'$ about to the edge of the other neck. The partitions $E'$ cover the water and prevent the water under the same from being vaporized, so that only the water carried above the partitions by the ice and the ice itself can vaporize, whereby the surface of the ice is cooled to such an extent that a layer of ice will be formed, and so on. After the blocks or cylinders of ice have been formed, the upper part of the cylindrical vessel D is swung upward, and the blocks are lifted out of the vessel D with the shaft $C'$, and then loosened from the shaft by admitting steam into the shaft and into the hollow pistons.

Referring to Figs. 10 to 12, inclusive, we have a machine constructed similarly to the one just described. The tubular shaft $C'$ is journaled in a cylindrical vessel, F, composed of two semi-cylindrical sections hinged to each other, the upper one of which is provided with a neck, $F'$, connected with the pipe of a vapor-exhaust apparatus of some suitable kind. A small hollow piston, G, is mounted on the tubular shaft $C'$, which shaft is provided with a cog-wheel, $d$, for revolving it. A series of transverse horizontal sliding plates, $F^2$, are held in the cylindrical vessel F, the said plates being adapted to slide in the direction of the length of the cylindrical vessel, and the lowest of the said plates having its outer edge beveled in such a manner that it will be exactly on the horizontal diameter of the cylindrical vessel F, the said beveled edge extending across the middle of the piston G. As the block of ice, I, formed around the piston G increases in thickness, it gradually pushes the plates from each other and toward the ends of the cylindrical vessel. At the same time that the thickness of the block I increases its diameter also increases. Plates $F^3$ are provided to rest against the periphery or circular edge of the block, which plates $F^3$ are gradually pushed toward the sides of the cylindrical vessel F as the diameter of the block of ice increases. The plates $F^3$ also slide under each other in the same manner as the plates $F^2$, and as has been described. The last machine differs from the one described before it, inasmuch as that in the first machine the thickness only of the block increases, whereas in the last machine the thickness and diameter increase at the same time. The vapor is exhausted from the upper part of the cylindrical vessel F, and thereby the water on the surface of the piston or of the block formed on the piston will be congealed, the fresh ice-surface thus formed is again moistened, and the water is again congealed, and so on. The block of ice is thus gradually enlarged.

Referring to Figs. 13 and 14, the tubular shaft C is journaled in a cylindrical vessel, H, and is provided at one end with the gear-wheel $d$, for revolving it. The cylindrical vessel H is composed of two semi-cylindrical sections hinged to each other, of which the upper section, $H'$, is provided with a neck, $H^2$, connected with the pipe of a vapor-exhaust apparatus. In the under side of the upper section, $H'$, of the cylindrical vessel H two wings, J J, are pivoted, which extend from one end of the cylinder to the other, and are of such length that they can reach down to and come in contact with the surface of the tubular shaft $C'$ in such a manner that their edges will rest on the tubular shaft in the horizontal plane. Thus exactly half of the shaft will be above and half below the free edges of the wings J. The wings J are to be pivoted to the under side of the section $H'$, as near the edges of the neck $H^2$ as possible. Springs $J'$, of any suitable construction, can be provided for pressing the free edges of the wings J against the tubular shaft $C'$, and the said springs can either be attached to the wings J in such a manner as to draw them together, or they can be attached to the wings and to the upper surface of the semi-cylindrical section $H'$, and may consist of band or coiled springs. The free edges of the wings J are pressed against the sides of the tubular shaft $C'$, or against the cylindrical block of ice formed on the said shaft. The vapor is exhausted through the neck H², and thus the space bounded by one-half of the cylindrical surface of the shaft, or the cylinder of ice formed on the same by the ends of the section H' and by the wings J, will not contain any air, or only rarefied air, and the water on the exposed part of the shaft C', or of the cylinder of ice formed on the same, will be congealed by the cold produced by evaporation, and as the shaft is being revolved a freshly-moistened surface will be continuously exposed to the partial vacuum and will be congealed, and thereby a spiral layer of ice will be formed on the tubular shaft C'. The surface of the water in the lower part of the cylindrical vessel H will not be congealed, as the wings J prevent the vapor from being exhausted from those parts of the section H' above the surface of the water. As the diameter of the cylinder of ice increases, the wings J are pressed toward the sides of the section H', but always rest closely against the surface of the cylinder of ice, to prevent the vapor from being exhausted from the surface of the remaining water. After the block is formed, the upper section, H', can be swung over to one side, and the block I of ice can be removed and released from the shaft by admitting steam into the shaft in the manner previously described. If desired, rubber or leather packing-strips can be placed on the ends of the wings.

Referring to Figs. 15 and 16, a cylindrical vessel, K, is mounted on two sets of journaled rollers, K', resting on a suitable base. The heads K² and K³ of the cylindrical vessel K are each provided with a central aperture, K⁴. The head K³ is made removable, and is held on the end of the cylindrical vessel in any suitable manner. A trough, L, having a segmental cross-section, as shown in Fig. 15, and of the length of the cylindrical vessel K, in which it fits, is provided at the top with a neck, L', which is covered with a flexible tube or hose, L², connected by a pipe, L³, with a water-supply tank or pump. The edges of the sides of the trough L are provided with beads or with rubber or leather packing-strips.

For operating the machine, vapor-exhaust pipes are coupled on one end of the cylinder, so that the vapor can be exhausted by means of any suitable vapor-exhausting apparatus. Water is then admitted through the pipe L³ and the hose L² into the trough L, and the cylinder K is revolved by turning the pulleys K', or in any other suitable manner. The water moistens the inner surface of the cylinder K, and as the same revolves the entire inner surface of the cylinder will be moistened. As the vapor is exhausted from the cylinder the water congeals and a layer of ice is formed. As the cylinder K revolves continuously, the water in the trough L will continue to moisten the inner surface of the cylinder of ice formed within the cylinder K, and for every revolution of the cylinder K a fresh layer of ice will be formed on the other layers, or on the inner surface of the cylinder of ice, and thereby the thickness of the wall of the said cylinder of ice will gradually increase toward the interior until the diameter of the hole remaining is slightly greater than the greatest height of the trough L, so as to permit of withdrawing the said trough from the central bore of the cylinder of ice I. The air-exhaust pipes are disconnected, the trough L is withdrawn, the head K³ is removed, and the block of ice is taken out of the cylinder, and then the above-described operation is repeated.

Referring to Figs. 17, 18, and 19, a vertical cylindrical vessel, M, constructed of brick, stone, or other suitable material, so that it will not be apt to collapse, is provided with a laterally-projecting neck, M', to which a vapor-exhaust apparatus can be coupled, and with two openings, M² M², closed by suitable doors, through which openings the ice can be removed. The outer surface of the vessel can be provided with a coating of cement or other analogous suitable material, to prevent the air from leaking through the walls into the interior of the vessel. In the bottom of the cistern or vessel thus formed is a socket, M³, for receiving the lower end of a vertical shaft, N, projecting through the top of the vessel or receptacle, on which shaft a cog-wheel, N', is journaled in such a manner that the shaft N can slide through the said cog-wheel, but must turn with the cog-wheel. The shaft projects into a tubular casing, O, formed on the top of a casing, O', secured firmly on the top of the cylindrical vessel or receptacle M. A pinion, O², engages with the cog-wheel N', and is mounted on a shaft, O³, provided with a belt-pulley, O⁴, so that by revolving the said shaft the shaft N will be revolved. A tube, P, passes through a stuffing-box in the top of the casing O, passes down through the casing O and through the cog-wheel N', and extends down to a ring, P', surrounding the shaft N at its lower end. One or more radial boxes or inverted troughs, P², are secured on the lower end of the shaft N, and extends almost to the inner surface of the vessel or receptacle M, so that the circle formed by the outer ends of the said boxes will be of less diameter than the interior of the said receptacle or vessel. The inverted troughs or boxes P² are connected at their inner ends with the ring P', so that if water is conducted through the tube P it will enter the ring P', and will be conducted into the several troughs P². When the operation begins, the bottom edges of the troughs or boxes P² rest on the bottom of the receptacle or vessel M, and if water is conducted into the boxes and the boxes are revolved by the shaft N, the floor of the receptacle will be moistened. The air is exhausted from the vessel, and the water on the bottom of the vessel M congeals and forms a thin layer of ice. As the boxes continue to rotate, water is brought in contact with the cold surface of the ice already formed, which water congeals to it and forms a fresh layer of ice, and so on. The block of ice gradually thickens, and thereby the boxes are moved upward, and the shaft N and the tube P, connected with the boxes, are also moved upward and slide into the casing O, the tube P sliding through the stuffing-box at the top of the casing O. This is continued until the block of ice I extends to the neck M; then the side openings, $M^2$, are opened, and the block of ice is broken by means of suitable implements inserted through the said openings, and the ice is removed through the openings.

In all the machines described heretofore the water was distributed on the block of ice, or on the plate, disk, cylinder, &c., on which the ice was to be formed, by a rotary movement; but the water can also be distributed by reciprocating machinery, as shown in Figs. 20 and 21, which represent a strong cylindrical, square, or other suitable casing, Q, which casing has one fixed end, $Q'$, and a removable end, $Q^2$. Adjoining the fixed end $Q'$ there is a transverse partition, $R'$, and adjoining the removable end $Q^2$ there is a removable transverse partition, $R^2$. The bottom of the vessel Q is provided with tracks or rails $Q^3$, extending from one end to the other, on which tracks or rails the wheels of a platform, R, run, the ends of which platform fit into grooves in the lower parts of the partitions $R'$ $R^2$. A series of inverted transverse troughs, S, are connected by tubes $S'$, and one of the troughs S is provided with an upwardly-projecting neck, $S^2$, which is connected by a flexible tube or hose, $S^3$, with a water-supply pipe, $S^4$. A connecting-rod, $S^5$, connects one of the troughs S with a crank-arm, $m$, at the lower end of a vertical shaft, $n$, on which a cog-wheel, $o$, is keyed in such a manner that the shaft $n$ revolves with the cog-wheel $o$, but can slide through the same into a tubular casing, $p$, held in a casing, $p'$, secured on the top of the vessel Q, and surrounding the cog-wheel $o$, and a pinion, $q$, engaging with the cog-wheel $o$, and mounted on a shaft, $r$, provided with a belt-pulley, $s$. The lower end of the shaft $n$ is held in a cross-piece, $m'$, the ends of which slide in grooves $t$ in the partitions $R^3$, fitting closely against the side edges of the platform R, the said cross-piece being adapted to slide upward with the shaft $n$. The vessel Q is provided with a neck, $Q^5$, to which a pipe can be coupled for connecting the compartment or vessel with a vapor-exhausting apparatus. When the machine is started, the troughs S rest on the platform R, and the water which is admitted to the troughs moistens the upper surface of the platform as soon as the troughs are reciprocated over the platform by the shaft $n$, and as the vapor is exhausted from the compartment or vessel Q the water distributed on the platform R will be congealed and a layer of ice formed. As water is being spread continuously on the surface of the ice formed and the said water congeals, layers of ice will be formed continually, and the block of ice will increase in thickness, moving the troughs S upward with it, and also carrying the shaft $n$ upward. When the block of ice is completed, the end $Q^2$ and the partition $R^2$ are removed, and the platform R is drawn out of the receptacle or vessel Q, the ice is removed from the same, and the above-described operation will be repeated.

All the different forms and constructions of my improved ice-machine work on the same principle. The ice is formed by cooling a surface of ice a few degrees below the freezing-point by vaporizing part of the ice, then submerging this surface, and thereby causing a quantity of water to congeal to the surface, whereby a layer of ice from one sixty-fourth to one-eighth of an inch thick is formed, and so on. The temperature of the water is but slightly above the freezing-point, so that when ice having a temperature of 20° Fahrenheit is brought in contact with water having a temperature of 32½° the heat passes from the water to the ice, and as the water is thus cooled very rapidly it congeals on the surface of the ice, and thus increases the thickness of the same. The latent heat evolved by the freezing is absorbed by the large block of ice. Naturally the ice can be formed by forcing cold air into the freezing device in place of producing the cold by vaporization.

Any suitable pump, blower, or vapor-exhausting device can be used for exhausting the vapor in the freezing-chamber for the purpose of producing the cold required for congealing the water; but I prefer to use bellows of an especial construction, which I have shown in Figs. 22, 23, and 24. A series of double bellows, T, are held between transverse partitions $T'$ of a frame, V, the bellows-compartments being separated by valve-compartments $T^2$, each connected with the bellows and with a pipe, $T^3$, connected with an outlet-pipe, $T^4$. The frame V is surrounded by a shell, $V'$, of masonry or of metal, which shell, if made of masonry, must be cemented, so as to prevent the leakage of air. The shell or casing $V'$ is provided with a neck, $V^2$, to which the exhaust-pipe of the ice-machine is coupled. The inner or adjoining ends of each pair of bellows T are secured to a transverse platform, W, which several platforms W are secured to a piston-rod, $W'$, passing through stuffing-boxes in the top of the casing $V'$ and in the top and bottom of the frame V. If the rod $W'$ is moved upward, the bottom bellows— that is, the bellows attached to the under side of the plates W—will be opened, and the vapor entering through the neck $V^2$ will be drawn into the bellows. At the same time the upper bellows are compressed or closed, and the vapor in them is forced out through the chambers $T^2$, the pipe $T^3$, and the pipe $T^4$. When the rod W' is moved downward, the upper bellows are opened, and the vapor entering through the neck V² is drawn into them, and the lower bellows are compressed, and the vapor in them is forced out through the pipes T³ and T⁴. The bellows exhaust and eject vapor continuously, and a large quantity of vapor can be exhausted by means of my improved device.

Although I prefer to use the above-described exhauster in connection with the machines described above, I do not wish to limit myself to this special machine.

Although I do not claim the details of construction of the above-described compound bellows, I do not abandon the same, but wish to make them the subject-matter of a separate application for Letters Patent which will be filed later on.

In Fig. 25 I have shown the general arrangement of my improved ice-machine, with means for condensing the vapor pumped from the freezing-chamber by the pump or bellows. The pump X, which may be a piston-pump, bellows, or blower of any other kind, is connected by the pipe X' with a serpentine pipe, X², which is connected with the neck B' of the chamber B, so that all the vapor must pass through the said serpentine pipe into the pump, and from the pump it then passes through a pipe, X³, into a condenser, Y, into which a perforated water-pipe, Y', projects. Water is forced through the said pipe Y', and spray drops from the top of the vessel Y to the bottom and condenses the vapor. The water flowing from the vessel Y is pumped off by a pump, Y². The serpentine pipe X² is provided at each curve with a transverse pocket or trough, U, each of which is provided with a horizontal slot, U', in the top. In each pocket U a series of water-circulating pipes, U², are arranged, each set of pipes U² being connected with a pipe, U³, which in turn is connected with a water-supply pipe, U⁴, which also conducts the water into the pipe Y'. The uppermost pocket U is connected by a pipe, w, with a pump, w', for pumping sulphuric acid through the pipe w into the uppermost pocket U until the uppermost pocket is filled with sulphuric acid. The acid then flows over the lower edge of the slot U' of the uppermost pocket and drops on the curved part of the serpentine pipe below and flows into the second pocket U, and when the same is filled the sulphuric acid flows into the third, and then into the fourth pocket, and when it arrives at the bottom of the serpentine pipe it flows into the pipe v. As the sulphuric acid drops through the space in the serpentine pipe it absorbs aqueous vapor, and thereby becomes gradually weakened or diluted, and the acid that flows into the pipe v is quite dilute. As the acid absorbs very great quantities of aqueous vapor, the quantity of vapor to be exhausted by the pump X will be materially reduced, and the cost of operating the ice-machine will be reduced accordingly.

In order to prevent the sulphuric acid from flowing along the curved surface of the serpentine pipe, as it is apt to do, I have provided a transverse ledge, apron, or tongue, u, a short distance below the lower edge of each slot U', which ledge, apron, or tongue causes the sulphuric acid to drop vertically, so that it can absorb the vapor. The sulphuric acid, which is heated by taking up the vapor, is cooled by the water circulating in the pipes U²; but when it flows into the pipe v it is still quite warm. The warm diluted sulphuric acid passes from the pipe v through the pipe v' and the pipe v² to the upper part of a boiler, Z, containing flues Z'; and the diluted sulphuric acid is then heated, and the water is evaporated and passes as vapor through the pipe X⁵, which also leads to the condenser Y, and is therein condensed with the vapors from the pump X. The sulphuric acid is gradually condensed in the boiler Z, and the condensed acid flows through the pipes Z² to the pump w', and is again pumped into the pockets U, in the manner described.

As stated above, it is a matter of very great importance to reduce the quantity of vapor to be exhausted by the pump as much as possible, and I prefer to use the means just described; but any suitable means can be used for condensing the vapors, so that the quantity to be exhausted by the pump will be decreased.

Having thus described my invention, I claim as new and desire to secure by Letters Patent—

1. In an ice-machine where cold is produced by the vaporization of a portion of the ice, the alternate moistening of the surface of the ice, then exposing it to a high vacuum, causing the moisture and a portion of the ice to vaporize at the expense of heat from the remaining portion of the ice, thereby reducing its temperature, so that when it is again brought in contact with water a thin layer will freeze and congeal to it, substantially as set forth.

2. In an ice-machine where cold is produced by the vaporization of a portion of the ice, the dividing of the freezing-chamber into a water and vacuum compartment, arranged so that the forming block of ice alternately comes in contact with the water and then with the high vacuum, substantially as set forth.

3. An ice-machine constructed with means for alternately moistening surfaces and then subjecting the moistened surfaces to a high vacuum, with devices for preventing the supply of water for moistening the surfaces from congealing, and with means for automatically adjusting the size of the said protective means according as the block of ice increases in size, substantially as herein shown and described.

4. An ice-machine constructed with means for alternately immersing a surface in water and subjecting the moistened surface to a high vacuum, with sliding partitions for preventing the water in which the surface is immersed from vaporizing, substantially as herein shown and described.

5. In an ice-machine, the combination, with a cylindrical vessel open at one end and containing a sliding piston mounted on a revolving shaft, of a vessel fitting against the end of the said cylindrical vessel, and provided with a transverse partition dividing it into a bottom water-compartment and an upper compartment connected with a vapor-exhausting apparatus or a device for furnishing cold fluid, substantially as herein shown and described.

6. In an ice-machine, the combination, with a cylindrical vessel open at one end and containing a sliding piston mounted on a revolving shaft, of a vessel fitting against the end of the said cylindrical vessel, and provided with a transverse partition dividing it into a lower water-compartment and an upper compartment connected with a vapor-exhausting apparatus or a device for furnishing a cold fluid, the middle of the outer edge of the said partition being on the longitudinal axis of the two cylindrical vessels, and forming a bearing for the shaft on which the disk is mounted, substantially as herein shown and described.

7. In an ice-machine, the combination, with a cylindrical vessel secured on a frame pivoted on a car, of an additional cylindrical vessel against which the open end of the cylindrical vessel on the car fits, and of means for subjecting water to atmospheric influences for producing a block of ice within the cylindrical vessel, substantially as herein shown and described.

8. In an ice-machine, the combination, with the cylindrical vessel B, provided with a transverse partition, B⁶, of the cylindrical vessel A, having a greater diameter than the vessel B, which cylindrical vessel A is mounted on a frame pivoted on a car, of a disk or piston contained in the cylindrical vessel A, and of means for revolving it, substantially as herein shown and described.

9. In an ice-machine, the combination, with the cylindrical vessel B, of the cylindrical vessel A, of greater diameter than the vessel B, a car on which the vessel A is pivoted, a piston in the vessel A, which piston has the same diameter as the interior of the vessel B, and of a tubular shaft on which the piston is mounted, substantially as herein shown and described.

10. In an ice-machine, the combination, with the vessel B, of the vessel A, the piston C, the tubular shaft C', means for revolving the said shaft, and the transverse partition B⁶, in which the shaft C' is journaled, substantially as herein shown and described.

11. In an ice-machine, the combination, with the cylindrical vessels B A, of the shaft C', the disk or piston C, the transverse partition B⁶, in which the shaft C' is journaled, the bevel cog-wheel C³, and the pinion c, substantially as herein shown and described.

12. In an ice-machine, the combination, with the cylindrical vessels B A, of the shaft C', having its upper end screw-threaded, the disk or piston C, mounted on the shaft C', the cylindrical casing C⁶, provided with an internal screw-thread for receiving the screw on the shaft C', and means for revolving the shaft C', substantially as herein shown and described.

13. In an ice-machine, the combination, with the vessels B A, of the partition B⁶, the tubular shaft C', the hollow piston C, the internally-screw-threaded casing C⁶, the rod C⁷, for closing the upper end of the tubular shaft, and means for revolving the tubular shaft, substantially as herein shown and described.

14. In an ice-machine, the combination, with the cylindrical vessels B A, of the tubular shaft C', the disk or piston C, the transverse partition B⁶, the tubular pocket B⁸, for receiving the outer end of the tubular shaft, and means for revolving the said shaft, substantially as herein shown and described.

15. In an ice-machine, the combination, with the cylindrical vessels B A, of the partition B⁶, the tubular shaft C', the disk or piston C, means for revolving the shaft, the float B⁴, the float-casing B⁵, the inlet-tube B², and the valve B³, connected with the float, substantially as herein shown and described.

16. In an ice-machine, the combination, with the cylindrical vessels B A, of the transverse partition B⁶, the shaft C', the revolving disk or piston C, means for revolving the shaft C', and the agitator B⁷, contained in the compartment below the partition B⁶, substantially as herein shown and described.

17. In an ice-machine, the combination, with a vessel provided with a transverse partition dividing it into two compartments, of which the lower one is to contain water, and the upper one is adapted to be connected with an apparatus for exhausting vapor, or an apparatus adapted to furnish a cold fluid, of a removable vessel fitting against the vessel provided with a partition, which removable vessel is provided with a revolving piston or disk adapted to be moved in the direction of the length of the vessel, whereby a block of ice can be formed on the said disk or piston by revolving it, and whereby the piston or the end surface of the block of ice formed on the same will be alternately immersed in the water in the lower compartment of the vessel provided with the partition, and then will be subjected to atmospheric influences in the upper compartment above the partition, substantially as herein shown and described.

18. In an ice-machine constructed substantially as herein shown and described, the moistening of the surface of the ice by water contained in an inverted trough caused to reciprocate, revolve, or remain stationary, and the ice revolve, in such a manner that the surface of the ice where it increases in thickness alternately comes in contact with water and with a high vacuum, substantially as set forth.

19. The combination, with an ice-machine constructed with means for moistening a surface and then exposing it to rarefied air, of compound bellows for exhausting the vapor from the freezing-chamber, or chamber in which the moistened surface is exposed to the rarefied air, substantially as herein shown and described.

20. The combination, with an ice-machine, of a pump, blower, or bellows for exhausting the vapor, and a serpentine pipe provided with pockets for containing sulphuric acid, which pockets are so arranged that the sulphuric acid can drop from one pocket to another, substantially as herein shown and described.

21. The combination, with an ice-machine, of a pump, blower, or bellows for exhausting vapor, a serpentine pipe provided with pockets for receiving sulphuric acid, which pockets are so arranged that the sulphuric acid can flow from one to another, and pipes for circulating cooling-water in the pockets containing the acid, substantially as herein shown and described.

22. The combination, with an ice-machine, of a pump, blower, or bellows for exhausting vapor, a serpentine pipe provided with pockets for receiving sulphuric acid, and a pump for pumping the sulphuric acid to the uppermost pocket, substantially as herein shown and described.

23. The combination, with an ice-machine, of a pump, blower, or bellows for exhausting vapor, a pipe provided with pockets for receiving sulphuric acid, which pockets have slots at the top, and a ledge, apron, or tongue below each pocket, substantially as herein shown and described.

24. The combination, with an ice-machine, of a pump, blower, or bellows for exhausting vapor, and the pipe $X^2$, provided with pockets U, arranged above each other, substantially as herein shown and described.

25. The combination, with an ice-machine, of a pump, blower, or bellows for exhausting vapor, the pipe $X^2$, provided with pockets U, arranged above each other, the pipe $w$, for conveying sulphuric acid to the uppermost pocket, and an outlet-pipe, $v$, through which the sulphuric acid flows off after arriving at the bottom of the pipe $X^2$, substantially as herein shown and described.

26. The combination, with an ice-machine, of a pump, blower, or bellows for exhausting vapor, the pipe $X^2$, provided with pockets U, arranged above each other, the pipe $w$, the pipe $v$, the pipes $v'$ and $Z^2$, extending from the boiler, for concentrating the dilute sulphuric acid to the pipe $v$, and the pump at the lower end of the pipe $w$, substantially as herein shown and described.

JOHN PATTEN.

Witnesses:
OSCAR F. GUNZ,
C. SEDGWICK.